June 27, 1944.   N. B. WALES   2,352,238
MAGNETIC TRANSMISSION
Filed July 17, 1943   3 Sheets-Sheet 1

INVENTOR.
Nathaniel B. Wales
BY
C. E. Herrstrom H. E. Thibodeau
ATTORNEYS.

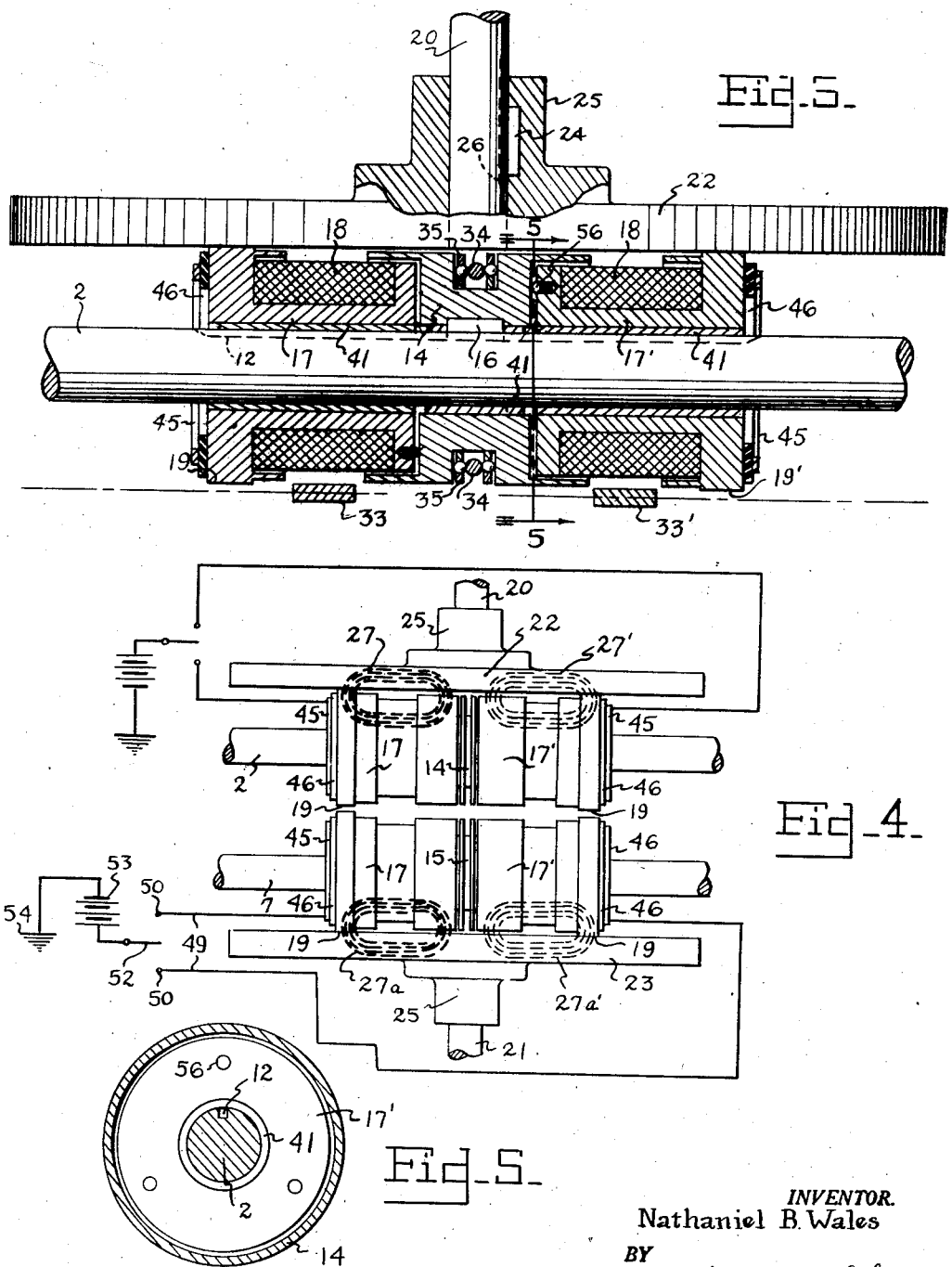

June 27, 1944.  N. B. WALES  2,352,238
MAGNETIC TRANSMISSION
Filed July 17, 1943  3 Sheets-Sheet 3
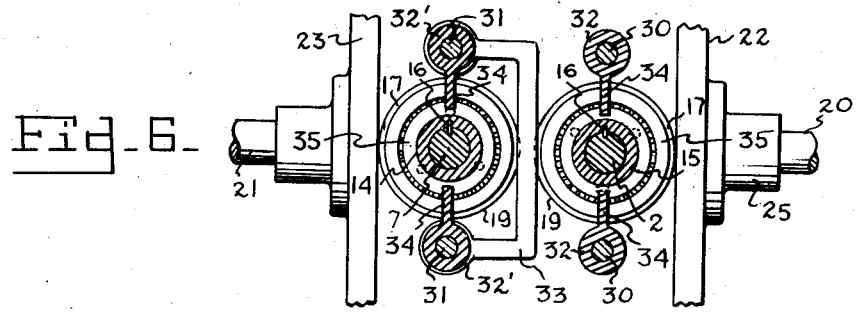
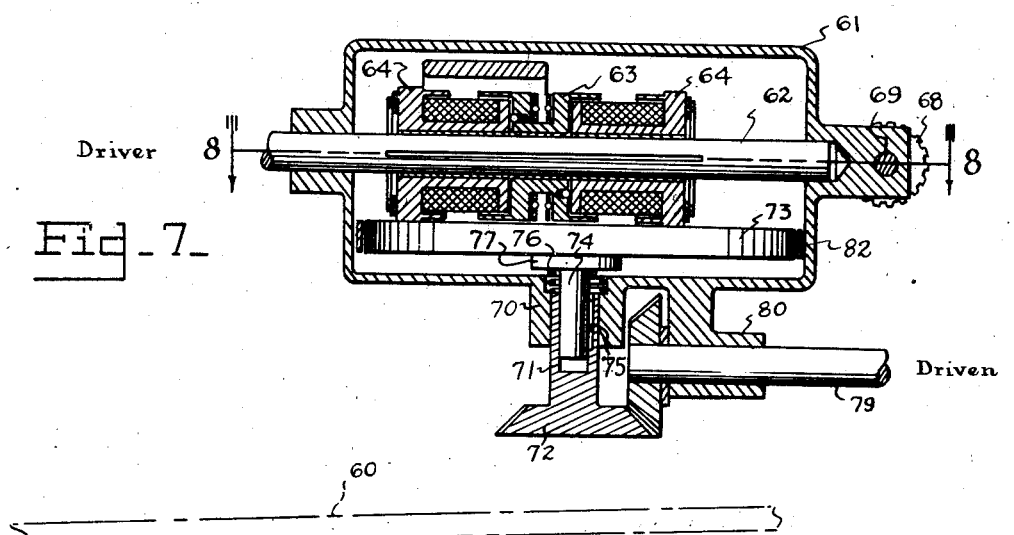
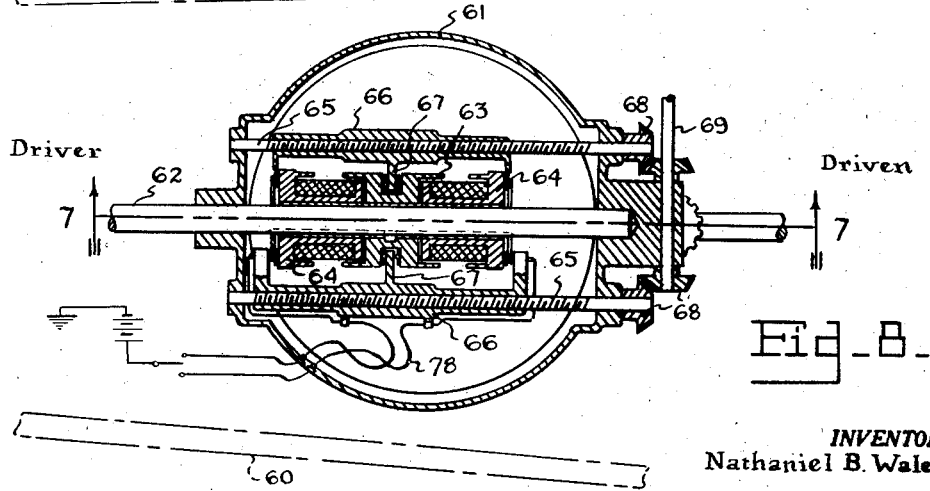
INVENTOR.
Nathaniel B. Wales
BY
ATTORNEYS.

Patented June 27, 1944

2,352,238

UNITED STATES PATENT OFFICE 2,352,238

MAGNETIC TRANSMISSION

Nathaniel B. Wales, Detroit, Mich.

Application July 17, 1943, Serial No. 495,221

5 Claims. (Cl. 74—195)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel transmission which employs the tractive forces of two surfaces in mutual rolling contact and under high surface pressure. The pressure, according to the invention, is produced by incorporating the rolling surfaces in the path of a dense magnetic field produced by a closed electro-magnetic circuit which includes the rolling surfaces and attracts them to one another under such pressure that one may be driven by rotation of the other.

The generation of surface pressure by magnetic attraction precludes any side thrust or torsion on the bearings of the revolving members of the transmission, as the pressure generated by the magnetic field is localized on their rolling contact.

The invention also discloses means for steering a two-track vehicle such as a combat tank. In such an installation there is a driven element for each track of the vehicle. Associated with each driven element is a drive shaft carrying freely rotatable electro-magnets adapted for driving engagement with the companion disk at opposite sides of its center of rotation. The system also includes means for magnetically clutching any selected magnet to its shaft to be driven thereby. This arrangement permits driving either disk in either direction by virtue of the driving points at opposite sides of the center of rotation of each disk and the selective means for exciting the magnets. The speed ratio is varied by shifting the magnets along their respective shafts or relatively to the center of the operative disk. By a combination of selective exciting and positioning of the electro-magnets, the vehicle may be driven and steered forward or backward at any speed ratio within the available range. A military vehicle equipped according to the invention therefore has high maneuverability and is adapted for change of torque ratios with great rapidity forward or backward, for quick turning and for escaping difficult terrain while under high torques.

Another object of the invention is to attain light weight in such a transmission without sacrificing durability and without complexity of mechanism. The invention is equally adaptable to trucks, automobiles, marine service and other types of installations.

The invention is fully disclosed by way of example in the following description and in the accompanying drawings in which:

Figure 3 is an enlarged detail of Figure 1;

Figure 4 is a plan view illustrating the flux circuit;

Figure 5 is a section on the line 5—5 of Figure 3;

Figure 6 is a section of the line 6—6 of Figure 2;

Figure 7 is a vertical section of a single installation for a conventional motor vehicle, and Figure 8 is a plan section on the line 8—8 of Figure 7.

Figure 1:
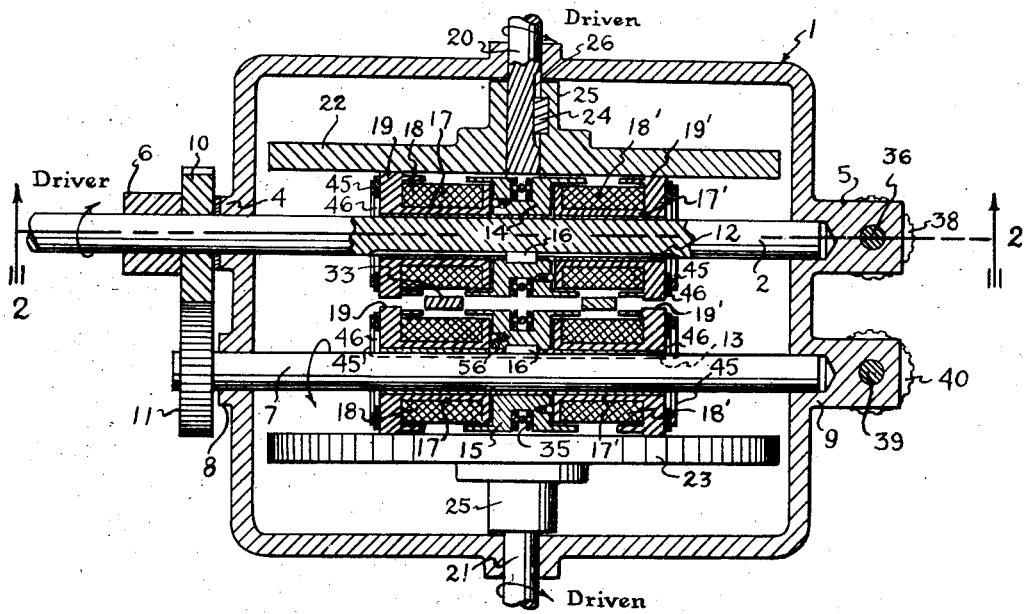
Figure 1 is a plan section of a dual embodiment of the invention, incorporating the functions of a transmission, steering gear, brake and clutch for track-laying vehicles.
Figure 2:
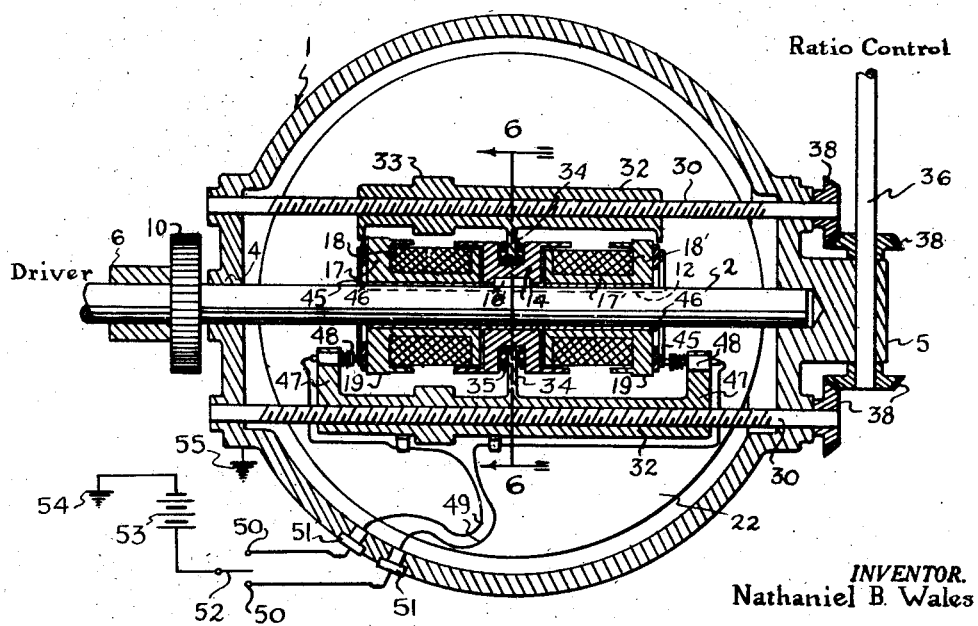
Figure 2 is a section on the line 2—2 of Figure 1.

In Figures 1 and 2 is shown a transmission case 1 through which is passed a drive shaft 2 mounted in bearings 4 and 5 in the case. An outboard bearing 6 for the shaft may also be provided. A countershaft 7 is also passed through the case in parallel relation to the shaft 2 and held in bearings 8 and 9. The shaft 7 is driven from the shaft 2 through equal gears 10 and 11 mounted respectively on the shafts 2 and 7.

Longitudinal keyways 12 and 13 are formed respectively in the shafts 2 and 7. This detail is shown more clearly in Figure 6, in which the shaft 2 is turned 180° from the position shown in Figure 1. Spools 14 and 15 are splined on the shafts 2 and 7 by keys 16 extending therefrom into the keyways 12 and 13.

On each shaft, on the same side of the corresponding spool, is rotatably mounted a magnetic rotor including a core 17 and winding 18. The outer end of the core is formed with a cylindrical rolling surface 19 of slightly enlarged diameter for a purpose which will presently be described.

On the opposite side of the corresponding spool, each shaft carries a similar magnetic rotor including a core 17' and winding 18', with a somewhat enlarged rolling cylindrical surface 19' on the outer end of the core.

A pair of alined driven shafts 20 and 21 perpendicular to the shafts 2 and 7 are rotatably mounted in the case 1 at opposite sides of the magnetic rotors. Disks 22 and 23 are secured on the shafts 20 and 21 respectively by means of a key 24 extending from the hub 25 of each disk into a keyway 26 in the corresponding shaft. Each disk engages the rolling surfaces 19 and 19' of the adjacent magnetic rotors.

The operative principle of the invention involves the establishment of a flux circuit, designated by the numeral 27 in Figure 4, through the magnetic rotor, the adjacent spool and the adjacent disk; it being understood that all of the parts are magnetic. The rotor thus becomes magnetically keyed to its shaft through the spool and its rolling surface 19 is attracted into firm frictional engagement with the disk. A drive from the shaft to the disk and its shaft 20 or 21 is thereby established. Where there are alined driven shafts 20 and 21, a second flux circuit 27a is likewise set up through the opposite rotor on the adjacent shaft. Since the shafts 2 and 7 run in opposite directions through the gears 10 and 11, the shafts 20 and 21 are driven in the same direction.

For imparting the opposite direction of rotation to the shafts 20, 21 flux circuits 27' and 27a' are set up through the magnetic rotors 17'—19' in the manner described. The speed of the shafts 20, 21 may be varied by shifting the magnetic rotors along their shafts 2, 7. The electrical circuit and the mechanism for shifting the magnetic rotors will now be described.

Each pair of coaxial rotors 17—19, 17'—19' has associated therewith a pair of screw shafts rotatably mounted in the case 1, designated by the numeral 30 in Figure 2 for one pair of coaxial rotors and by the numeral 31 for the other pair, as may be seen in Figure 6. For convenience in construction and assembly, each pair of screw shafts lies in a plane parallel to that of the associated disk 22 or 23. Each pair of screw shafts supports a shifting carriage including sleeves 32 or 32' screwed respectively on the shafts and joined by a bridge 33 or 33'. Shifting fingers 34 extend from the sleeves 32 into the recess of the spool 14, and similar fingers 34' extend from the sleeves 32' into the recess of the spool 15. Suitable bearings 35 are inserted between each finger and both walls of the recess in which it is received.

The screw shafts 30 are geared to a prependicular actuating shaft 36, journaled in the bearings 5, 9 on the case 1, by meshing bevel gears 38, as shown in Figure 2. Similarly, the shafts 31 are geared to an actuating shaft 39 by suitable gearing 40 appearing in Figure 1. It is now evident that rotation of one of the shafts 36, 39 shifts the corresponding pair of rotors 17—19, 17'—19' on its shaft 2 or 7 to alter the effective driving ratio between the rotors and the disks 22, 23. The several rotors and spools are preferably lined with bronze bushings 41 (Figure 6) movable therewith on the shafts 2 and 7.

The flux circuit through each of the windings 18, 18' is individually controlled. The wiring for two of the windings is illustrated in Figure 2, and a similar system may be employed for the other two windings.

The outer end of each core or frame, 17, 17' carries a slip ring 45 and an inserted insulating ring 46. One of the sleeves 32, 32' of each shifting carriage is formed at its ends with fingers 47 in each of which is mounted a spring-pressed brush 48 engaging the adjacent slip ring 45. Conductors 49 extend respectively from the brushes to terminals 50 outside of the case 1. The conductors 49 pass through suitable insulators 51 in the case. Current is supplied selectively to the terminals 50 through a movable switch finger 52 receiving current from a suitable source 53 having one side grounded at 54. Each slip ring 45 is electrically connected to one end of the corresponding winding 18 or 18', and the remaining end of the winding is connected in any approved manner to the case 1, the grounded condition of which is illustrated by the symbol 55 in Figure 2.

In the idle condition of the apparatus, with no current flowing through the rotor windings, the magnetic rotors, disks, and shafts 2 and 7 are free from one another except for the permanent gearing between the shafts. Only the spools 14, 15 are keyed to the shafts. The rotors are held slightly spaced from the ends of the spools by light spring-pressed balls 56 mounted in the ends of the spools. There is merely a free slipping, rolling contact between each cylindrical area 19, 19' and the adjacent disk 22 or 23, there being no mechanical tension therebetween.

The desired driving gear ratio between one or two cylindrical surfaces and the corresponding disk or disks is established by shifting the rotors in the manner described. The drive ratio obviously varies according to the distance of a given cylindrical surface from the center of the corresponding disk. Axially alined rotors necessarily move together because of the brush arrangement shown in Figure 2. Obviously, only one rotor at a time engaging a given disk will be energized since rotors disposed at opposite sides of the center are adapted to turn the disk in opposite directions.

Excitation of a given rotor brings its core magnetically into frictional contact with the adjacent spool 14 or 15 and with the contacting disk 22 or 23, at the cylindrical surface 19 or 19', through the flux circuits described in connection with Figure 4. The rotor becomes magnetically keyed to its shaft through the spool and its cylindrical surface has been brought into frictional driving engagement with the adjacent disk. Consequently, there is established a drive between the shaft 2 or 7 and the disk 22 or 23 in a ratio determined by the longitudinal position of the rotor on the shaft.

The dual system which has been described may, for example, have its output shafts 20 and 21 geared respectively to the tracks at the sides of a track-laying vehicle such as a combat tank. It will be assumed that the rotors 17 drive the shafts forward. With both rotors energized and at equal distances from the common axis of the shafts, the vehicle will move straight ahead. With both rotors energized and at unequal distances from the axis, or with only one rotor energized, the vehicle will be steered to one side or the other.

Reverse drive and steering are effected in like manner through the adjustment and excitation of the rotors 17'. On excitation of one rotor 17 and one rotor 17', operating on both disks and at equal distances from the common axis of the output shafts, the vehicle will be rotated on a fixed vertical axis. The desirability of these qualities for maneuverability is well recognized.

Figures 7 and 8 show the system applied, with a single disk and output shaft, to a conventional motor vehicle. The longitudinal frame members of the vehicle are designated by the numeral 60 and between them is mounted a cylindrical transmission case 61 on a vertical axis. A drive shaft 62 is journaled horizontally in the case 61 and coupled to the motor (not shown).

On the shaft 62 and within the case is slidably keyed a magnetic spool 63, at opposite sides of which are magnetic rotors 64 constructed in the manner previously described and therefore requiring no detailed description. At opposite sides of the shaft 62, preferably in a horizontal plane, screw shafts 65 are journaled in the case and fitted each with an internally threaded carriage sleeve 66 having a finger 67 projecting into the spool 63. The screw shafts are geared externally at 68 to an operating shaft 69 for shifting the carriage and the rotors in the manner already described.

From the bottom of the case 61, a bearing 70 extends downward and journals the stub shaft 71 of a bevel gear 72. A driven disk 73, corresponding to the disks 22 and 23 previously described, is mounted beneath the rotors by means of a stub shaft 74 extending into the shaft 71 and slidably keyed thereto at 75. A spring 76 is inserted between the top of the shaft 74 and a smaller disk 77 on the bottom of the disk 73. The purpose of this spring is merely to balance the weight of the disk assembly and avoid an excessively large air gap between the disk 73 and the rotors 64. The frictional driving contact is established entirely by the flux circuit in the manner already described. The wiring to the rotors is indicated by the numeral 78 and is generally similar to that previously described.

The output or propeller shaft 79 is preferably supported at one end in a bearing 80 depending from the bottom of the case adjacent to the bearing 70. One end of the shaft 79 carries a bevel gear 81 meshing with the gear 72, and the other end is connected into the final drive of the vehicle in any approved manner.

This assembly conveniently accommodates the horizontally disposed disk 73 as well as the case 61, in approximately the position occupied by the conventional transmission mechanism. The periphery of the disk may be used as an emergency braking surface to be engaged by a manually actuated brake band 82.

As in the previous construction, the direction of the vehicle is controlled by selectively exciting the rotors 64, and the drive ratio is controlled by adjustment of the distance of the excited rotor from the center of the disk 73.

It is to be noted that the coefficient of sliding friction of a rolling contact, which governs the transfer of power from the cylindrical surface of rotors to the disks, is approximately .40 when both parts are wrought iron and under a pressure of 600 lbs. per linear inch of contact. This pressure can be far exceeded by the magnetic attraction set up on the contacting surfaces by the magnetic circuits developed in the manner described. For example, if 1000 ft. lbs. is to be transmitted, the pressure per linear inch must be 1000/.40=2500 lbs. Pressures of this order are easily obtained by the proper magnetic design.

Although specific embodiments of the invention have been illustrated and described, it will be understood that various alterations in the details of construction may be made without departing from the scope of the invention as indicated by the appended claims.

What I claim is:

1. A transmission comprising a drive shaft, an electromagnet rotatably mounted thereon and having a circular peripheral portion, a rotatably mounted driven member adapted for engagement with said portion, a driving element permanently rotatable with said shaft and disposed adjacent to said electro-magnet, and means for exciting said electro-magnet to attract said driven member and driving element thereto under driving pressure.

2. A transmission comprising a driving shaft, a driving element rotatable therewith and slidable thereon, a pair of electro-magnets rotatably mounted on said shaft at opposite sides of said element, a rotatably mounted driven member adjacent to said electro-magnets, each electro-magnet having a circular peripheral portion adapted to engage said driven member at opposite sides of its center of rotation, respectively, means for selectively exciting said electro-magnets, each excited magnet being adapted to attract said driving element and said driven member into driving engagement therewith.

3. A transmission comprising a driving shaft, a driving element rotatable therewith and slidable thereon, a pair of electro-magnets rotatably mounted on said shaft at opposite sides of said element, a rotatably mounted driven member adjacent to said electro-magnet, each electro-magnet having a circular peripheral portion adapted to engage said driven member at opposite sides of its center of rotation, respectively, means for selectively exciting said electro-magnets, each excited magnet being adapted to attract said driving element and said driven member into driving engagement therewith, and means for shifting said driving elements and magnets on said shaft, whereby to alter the driving ratio between said shaft and driven member.

4. A transmission comprising a driving shaft, a driving element rotatable therewith and slidable thereon, a pair of electro-magnets rotatably mounted on said shaft at opposite sides of said element, a rotatably mounted driven member adjacent to said electro-magnet, each electro-magnet having a circular peripheral portion adapted to engage said driven member at opposite sides of its center of rotation, respectively, means for selectively exciting said electro-magnets, each excited magnet being adapted to attract said driving element and said driven member into driving engagement therewith, and a carriage movable lengthwise on said shaft and adapted to shift said driving element and magnet lengthwise on said shaft, whereby to alter the driving ratio between said shaft and driven member.

5. A combined transmission and steering means for track-laying vehicles comprising two driven disk members adapted for connection respectively to the tracks of such vehicle, a pair of drive shafts, a pair of electro-magnets rotatably mounted on each of said shafts, each magnet having a circular peripheral portion adapted for engagement with the adjacent disk at opposite sides of its center of rotation, means for selectively exciting said magnets to attract said disks to said portions under driving pressure, means for selectively magnetically securing said magnets to said shafts, and means for shifting said magnets on said shafts, whereby to vary the driving ratio between the peripheral portion of the excited magnet and the associated disk.

NATHANIEL B. WALES.